(12) United States Patent
Chaumonnot et al.

(10) Patent No.: US 10,655,069 B2
(45) Date of Patent: *May 19, 2020

(54) PROCESS FOR THE SYNTHESIS OF HYDROCARBONS FROM SYNTHESIS GAS IN THE PRESENCE OF A CATALYST BASED ON COBALT TRAPPED IN A MESOPOROUS OXIDE MATRIX AND OBTAINED FROM AT LEAST ONE MONOMERIC PRECURSOR

(71) Applicant: IFP Energies Nouvelles, Rueil-Malmaison (FR)

(72) Inventors: Alexandra Chaumonnot, Lyons (FR); Antoine Fecant, Brignais (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 13 days.

This patent is subject to a terminal disclaimer.

(21) Appl. No.: 15/778,101

(22) PCT Filed: Nov. 7, 2016

(86) PCT No.: PCT/EP2016/076881
§ 371 (c)(1),
(2) Date: May 22, 2018

(87) PCT Pub. No.: WO2017/089111
PCT Pub. Date: Jun. 1, 2017

(65) Prior Publication Data
US 2018/0346821 A1    Dec. 6, 2018

(30) Foreign Application Priority Data

Nov. 23, 2015   (FR) ..................... 15 61270

(51) Int. Cl.
| | |
|---|---|
| C10G 2/00 | (2006.01) |
| B01J 23/74 | (2006.01) |
| B01J 23/75 | (2006.01) |
| B01J 37/18 | (2006.01) |
| B01J 29/03 | (2006.01) |
| B01J 35/10 | (2006.01) |
| B01J 37/00 | (2006.01) |
| B01J 23/89 | (2006.01) |
| B01J 35/08 | (2006.01) |
| B01J 37/02 | (2006.01) |
| B01J 37/04 | (2006.01) |
| B01J 37/08 | (2006.01) |
| B01J 37/03 | (2006.01) |

(52) U.S. Cl.
CPC .............. *C10G 2/332* (2013.01); *B01J 23/74* (2013.01); *B01J 23/75* (2013.01); *B01J 23/89* (2013.01); *B01J 29/0333* (2013.01); *B01J 35/08* (2013.01); *B01J 35/1014* (2013.01); *B01J 35/1019* (2013.01); *B01J 35/1038* (2013.01); *B01J 35/1042* (2013.01); *B01J 35/1061* (2013.01); *B01J 37/0045* (2013.01); *B01J 37/0201* (2013.01); *B01J 37/04* (2013.01); *B01J 37/08* (2013.01); *B01J 37/18* (2013.01); *B01J 37/03* (2013.01); *B01J 2229/18* (2013.01); *C10G 2300/703* (2013.01)

(58) Field of Classification Search
CPC .... B01J 23/75; B01J 35/1038; B01J 35/1046; B01J 35/1061; C10G 2/332; C10G 2300/75; C10G 2300/703
See application file for complete search history.

(56) References Cited

U.S. PATENT DOCUMENTS

| | | | |
|---|---|---|---|
| 7,560,412 B2 | 7/2009 | Osbourne et al. | |
| 2006/0035783 A1 | 2/2006 | Osbourne et al. | |
| 2007/0287759 A1* | 12/2007 | Visagie | B01J 21/12 518/715 |
| 2012/0022174 A1* | 1/2012 | Yang | B01J 23/002 518/721 |
| 2014/0005031 A1 | 1/2014 | Chaumonnot et al. | |
| 2016/0089662 A1* | 3/2016 | Jothimurugesan | B01J 37/18 502/209 |
| 2017/0014808 A1* | 1/2017 | Bae | C10G 2/332 |

FOREIGN PATENT DOCUMENTS

| | | |
|---|---|---|
| EP | 1233011 A1 | 8/2002 |
| FR | 2969509 A1 | 6/2012 |
| WO | 2006/020648 A1 | 2/2006 |

OTHER PUBLICATIONS

Hong ("Effect of promotion with ruthenium on the structure and catalytic performance of mesoporous silica (smaller and larger pore) supported cobalt Fischer-Tropsch catalysts" Catalysis Today 140 (2009) 135-141).*
International Search Report dated Feb. 8, 2017 issued in corresponding PCT/EP2016/076881 application (2 pages).
English Abstract of EP 1233011 A1 published Aug. 21, 2002.

* cited by examiner

*Primary Examiner* — Jun Li
(74) *Attorney, Agent, or Firm* — Millen White Zelano and Branigan, PC; Csaba Henter

(57) ABSTRACT

A process for the synthesis of linear paraffinic hydrocarbons from a feed of carbon monoxide and dihydrogen in the presence of a catalyst of a mesoporous oxide matrix and a content by weight of the element cobalt of 0.5% to 60%, wherein the catalyst is prepared by
  a) mixing, in an aqueous or hydro-organic solvent, a molecular precursor containing cobalt and a molecular precursor of the mesoporous oxide matrix containing element X of silicon, aluminium, titanium, zirconium and or cerium;
  b) aerosol spray drying the mixture to form spherical liquid droplets;
  c) drying to obtain solid particles at a temperature of 10° C. to 300° C.;
  d) activation by a reduction treatment to form nanoparticles of cobalt with an oxidation state of 0.

15 Claims, No Drawings

PROCESS FOR THE SYNTHESIS OF HYDROCARBONS FROM SYNTHESIS GAS IN THE PRESENCE OF A CATALYST BASED ON COBALT TRAPPED IN A MESOPOROUS OXIDE MATRIX AND OBTAINED FROM AT LEAST ONE MONOMERIC PRECURSOR

TECHNICAL FIELD OF THE INVENTION

The present invention relates to the field of Fischer-Tropsch (FT) processes, i.e. to processes for the synthesis of hydrocarbons from synthesis gas. More particularly, the present invention relates to a process for the synthesis of hydrocarbons from synthesis gas using a catalyst based on the element cobalt trapped in a mesoporous oxide matrix and obtained from at least one molecular precursor.

PRIOR ART

Fischer-Tropsch processes can be used to obtain a wide range of hydrocarbon cuts from a mixture of $CO+H_2$, commonly known as synthesis gas. The overall equation for Fischer-Tropsch synthesis can be written as follows:

$$n\ CO + (2n+1)H_2 \rightarrow C_nH_{2n+2} + n\ H_2O$$

Fischer-Tropsch synthesis is at the heart of processes for the conversion of natural gas, coal or biomass into fuels or intermediates for the chemical industry. These processes are known as GTL ("Gas to Liquids") when natural gas is used as the initial feed, CTL ("Coal to Liquids") for coal, and BTL ("Biomass to Liquids") for biomass.

In each case, the initial feed is initially gasified into synthesis gas, a mixture of carbon monoxide and dihydrogen. The synthesis gas is then mainly transformed into paraffins using the Fischer-Tropsch synthesis, these paraffins then possibly being transformed into fuels using a hydroisomerization-hydrocracking process. As an example, transformation processes such as hydrocracking, dewaxing and hydroisomerization of heavy cuts (C16+) can be used to produce various types of fuels in the middle distillate range: gas oil (180-370° C. cut) and kerosene (140-300° C. cut). The lighter C5-C15 fractions may be distilled and used as solvents.

The Fischer-Tropsch synthesis reaction may be carried out in various types of reactors (fixed bed, moving bed or three-phase (gas, liquid, solid), for example of the continuously stirred autoclave type, or bubble column type) and the reaction products have the particular characteristic of being free from sulphur-containing, nitrogen-containing or aromatic type compounds.

In one implementation in a bubble column type reactor (or "slurry bubble column"), which can be simplified to "slurry"), the catalyst is characteristically employed by dividing it into a very fine powder state, typically of the order of a few tens of micrometres, that powder forming a suspension with the reaction medium.

The Fischer-Tropsch reaction is conventionally carried out between 1 and 4 MPa (10 to 40 bar) at temperatures which are traditionally between 200° C. and 350° C. The reaction is exothermic overall, meaning that particular attention has to be paid to how the catalyst is used.

The catalysts employed for the Fischer-Tropsch synthesis are essentially catalysts based on cobalt or iron, although other metals can be used. However, cobalt and iron offer a good performance/price compromise compared with other metals.

Conventional methods for the preparation of supported metallic catalysts used for the Fischer-Tropsch synthesis consist of depositing a precursor of the active phase (metallic salt or metal-ligand coordination complex) on an oxide support (generally from the alumina family), then carrying out an activation step consisting of one or more heat treatment(s) carried out in air and/or in hydrogen. More specifically, the processes for the preparation of such catalysts necessitate many steps which may be summarized as follows: synthesis of the oxide support (for example using the "spray drying" synthesis process, resulting in the production of powders which are compatible with a "slurry" type implementation), one or more impregnation step(s) in order to deposit the metallic precursor, optionally one or more step(s) for drying and/or calcining in air and, finally, one or more activation (reduction) step(s). Each of those steps plays a role in the performances of the resulting catalyst in terms of activity, selectivity and stability under the operating conditions of the process. In particular, the content, size, accessibility and thus the dispersion of the metallic active phase will depend on parameters such as: the nature and solubility of the metallic precursor, the textural and surface properties of the pre-formed oxide support and the operating parameters for the impregnation in order to control the metallic precursor/surface of the oxide support interactions.

In order to make Fischer-Tropsch synthesis processes competitive compared with other processes for the synthesis of hydrocarbons which have a higher yield but are less attractive ecologically (processes for the transformation of fossil resources), one possible route to improvement consists of simplifying the conventional methods for obtaining FT catalysts described above, while maintaining (or even increasing) the associated catalytic performances. Such a simplification could be used to make substantial savings in terms of the starting materials used, the energy consumed, the production of waste, the size-to-capacity ratio of the process, and thus would apply the concept of "process intensification" to the field of Fischer-Tropsch synthesis.

For about a decade now, the scientific community has been focussing on an original synthesis methodology combining "sol-gel" chemistry with specific synthesis processes such as atomization (also known as "spray drying"), the deposition of thin films (also known as "spin coating"), etc. That approach has not only provided access to innovative oxide supports for catalysis, but has also provided a "direct" method for the synthesis of catalysts which dispenses with the usual "synthesis of oxide support+deposit of precursor of active phase" combination. The review which appeared in *Advanced Materials* (2011, 23, 599) provides an overall view of the work carried out in this regard over the past few years. As an example, pre-formed metallic nanoparticles (NP) formed from gold, oxides of titanium, iron or caesium have thus been incorporated directly during the synthesis of the mesoporous silicon-containing oxide matrix, this latter usually being obtained using a distinct process leading to what is known as the "support". This approach has been successfully used to obtain hydrotreatment, hydrocracking and hydroconversion catalysts (FR 2 886 636, FR 2 969 509, FR 2 969 511, FR 2 969 514, FR 2 969 513) or metathesis catalysts (FR 2 977 890). However, it has not been explored to a great extent for the development of FT catalysts. One explanation for this is probably linked to the complexity of such a methodology. In fact, the reactivity of each metallic element is relevant to its nature, to the selected precursors and to the chemical environment imposed by the synthesis medium (solvent, concentration, pH, temperature, organic and/or inorganic additives, etc) and the process employed (process parameters such as the flow rates (feed and vector gas), the spray drying temperature, the technology of the nozzle generating the aerosol, etc). As a consequence, the development of novel solids in terms of chemical formulation and the intrinsic properties expected for a specific application, is not a trivial matter.

Zeng and al., *Journal of Aerosol Science*, 2014, 76, 1, mentions the synthesis of a potential catalyst for the application (FT). In their work, pre-formed nanoparticles of cobalt oxide are added to a suspension resulting from a mixture of colloidal sols of silica (pre-formed nanoparticles of silica) and an organic polymer used as a generator of the porosity. Zeng and al. indicate that disappointing results are obtained, in particular a poor dispersion of the element cobalt, starting from cobalt precursors in solution. That strategy, although it is a precursor in the "direct" synthesis of catalysts based on cobalt, suffers from the major drawback of operating with pre-formed nanoparticles of $Co_3O_4$, because obtaining them is difficult, lengthy to carry out (a plurality of synthesis steps) and of low compatibility with industrial production (low yield, high solvent consumption, severe operating constraints in order to ensure stability of such colloidal sols, etc). In addition, employing pre-formed nanoparticles based on Co and silica limits the reactivity of the species to interactions between nanoparticles and does not involve the chemistry of molecular precursors (or lead to molecular species) which is much finer and versatile in terms of potentiality of the materials. Finally, no test associated with the FT application has proved the efficiency of such solids for this application.

WO2006/020648 A1 discloses a process for the preparation of a catalyst and its application in the Fischer-Tropsch process. The catalyst is prepared by spray drying a liquid-solid mixture (slurry) comprising a precursor of cobalt, alumina powder and a peptizing agent which could be aluminium nitrate, the peptizing agent being used to provide a better dispersion of the alumina. This implementation requires that the alumina powder be pre-formed and the mixture be diluted with water in order to allow it to be pumped and spray dried. In addition, the use of pre-formed alumina again limits the potential interactions between the active phase and the oxide matrix to cobalt precursor—oxide surface interactions and excludes the chemistry of molecular precursors (or the resulting molecular species).

SUMMARY OF THE INVENTION

The invention concerns a process for the synthesis of linear paraffinic hydrocarbons from a feed comprising carbon monoxide and dihydrogen in the presence of a catalyst comprising a mesoporous oxide matrix and a content by weight of the element cobalt in the range 0.5% to 60%, expressed as the % by weight of metal with respect to the total weight of said catalyst, said catalyst being prepared in accordance with a process comprising at least the steps of:
  a) mixing, in an aqueous or hydro-organic solvent, at least one molecular precursor comprising cobalt and at least one molecular precursor of said mesoporous oxide matrix comprising at least one element X selected from the group constituted by silicon, aluminium, titanium, zirconium, cerium and mixtures thereof, said molecular precursors being dissolved in said aqueous or hydro-organic solvent;
  b) aerosol spray drying the mixture obtained in step a) in order to result in the formation of spherical liquid droplets;
  c) drying said spherical droplets in order to obtain solid particles at a temperature in the range 10° C. to 300° C.;
  d) activation of said solid particles by means of a reduction treatment in a manner such as to form nanoparticles of cobalt with an oxidation state of 0.

Advantage of the Invention

In one aspect, the invention proposes a process for the synthesis of paraffin hydrocarbons (Fischer-Tropsch process) in the presence of a catalyst prepared in accordance with a preparation process which exhibits an unprecedented simplification of the process for the production of catalyst which is conventionally employed in the Fischer-Tropsch process, which means that the cost of the production of the synthetic hydrocarbons obtained can be reduced and the ever more drastic environmental constraints of recent decades can be complied with. This simplification is achieved by developing a process for the preparation of said catalyst by spray drying, which can be used to completely or partially incorporate at least one precursor of the active phase, i.e. at least one precursor of the element cobalt, during the formation of the mesoporous oxide matrix, the matrix normally being termed the "support" in conventional synthesis methods.

The process for the preparation of the catalyst used in accordance with the invention exploits the potential of sol-gel chemistry, and in particular the chemistry inherent to the reactivity of molecular precursors, in solution, which differs from the chemistry that occurs between a precursor and a pre-formed solid or two pre-formed solids, irrespective of whether that solid is in the form of nanoparticles of cobalt, silica or alumina, in particular with interactions which are much more intimate because of the size of the molecules which are present. In the present invention, the direct incorporation of at least one precursor of the active phase during the synthesis of the mesoporous oxide matrix can be used to modify the "active phase precursors/pre-formed surface of the oxide support" interactions which usually control the content, size, accessibility, and thus the dispersion, of said active phase. The collective mixture of at least one molecular precursor of the element cobalt with at least one molecular precursor of said mesoporous oxide matrix comprising at least one element X selected from the group constituted by silicon, aluminium, titanium, zirconium, cerium and mixtures thereof, combined with the spray drying process, in the end results in materials with different catalytic performances compared with their homologues obtained using more conventional methodologies.

DESCRIPTION OF THE INVENTION

FT Synthesis Process

The process for the synthesis of linear paraffinic hydrocarbons, also termed the Fischer-Tropsch process, can be used to produce essentially linear, saturated C5+ hydrocarbons. In accordance with the invention, the term "essentially linear, saturated C5+ hydrocarbons" means hydrocarbons for which the proportion of hydrocarbon compounds containing at least 5 carbon atoms per molecule represents at least 50% by weight, preferably at least 80% by weight of the entirety of the hydrocarbons formed, the total content of olefinic compounds present in said hydrocarbon compounds containing at least 5 carbon atoms per molecule being less than 15% by weight. The hydrocarbons produced by the process of the invention are thus hydrocarbons which are essentially paraffinic, wherein the fraction with the highest boiling points may be converted with a high yield into middle distillates (gas oil and kerosene cuts) by a catalytic hydroconversion process such as hydrocracking and/or hydroisomerization.

Preferably, the feed used to carry out the process of the invention is constituted by synthesis gas, which is a mixture of carbon monoxide and hydrogen with $H_2/CO$ molar ratios which may vary between 0.5 and 4 depending on the production process from which it is obtained. The $H_2/CO$ molar ratio of synthesis gas is generally close to 3 when the synthesis gas is obtained from a process for steam reforming hydrocarbons or alcohol. The $H_2/CO$ molar ratio of synthesis gas is of the order of 1.5 to 2 when the synthesis gas is obtained from a partial oxidation process. The $H_2/CO$ molar ratio of synthesis gas is generally close to 2.5 when it is obtained from an autothermal reforming process. The $H_2/CO$ molar ratio of synthesis gas is generally close to 1 when it is obtained from a process for the gasification and reforming of hydrocarbons with $CO_2$ (known as dry reforming).

The Fischer-Tropsch process in accordance with the invention is operated at a total pressure in the range 0.1 to 15 MPa, preferably in the range 0.5 to 10 MPa, at a temperature in the range 150° C. to 350° C., preferably in the range 180° C. to 270° C. The hourly space velocity is advantageously in the range 100 to 20000 volumes of feed, advantageously synthesis gas, per volume of catalyst and per hour (100 to 20000 $h^{-1}$), and preferably in the range 400 to 10000 volumes of synthesis gas per volume of catalyst per hour (400 to 10000 $h^{-1}$), the volume of feed being measured at 25° C. and 0.1 MPa.

The Fischer-Tropsch process in accordance with the invention may be carried out in a continuously stirred autoclave type, ebullated bed, bubble column, fixed bed or moving bed reactor. It is preferably carried out in a bubble column type reactor.

For this reason, the size of the grains of catalyst used in the Fischer-Tropsch process may be between a few microns and 2 millimetres. Typically, to operate in a three-phase "slurry" reactor (bubble column), the catalyst is finely divided and is in the form of particles. The size of the particles of catalyst will be in the range 10 to 500 micrometres ($\mu m$), preferably in the range 10 to 300 $\mu m$ and highly preferably in the range 20 to 150 $\mu m$, and yet more preferably in the range 20 to 120 $\mu m$.

Process for the Preparation of the Catalyst Used in Accordance with the Invention In accordance with the invention, the process for the synthesis of linear paraffinic hydrocarbons is carried out in the presence of a catalyst comprising a mesoporous oxide matrix and a content by weight of the element cobalt in the range 0.5% to 60%, expressed as the % by weight of metal with respect to the total weight of said catalyst, said catalyst being prepared in accordance with a preparation process comprising at least the following steps in succession:
 a) mixing, in an aqueous or hydro-organic solvent, at least one molecular precursor comprising cobalt and at least one molecular precursor of said mesoporous oxide matrix comprising at least one element X selected from the group constituted by silicon, aluminium, titanium, zirconium, cerium and mixtures thereof, said molecular precursors being dissolved in said aqueous or hydro-organic solvent;
 b) aerosol spray drying the mixture obtained in step a) in order to result in the formation of spherical liquid droplets;
 c) drying said spherical droplets in order to obtain solid particles at a temperature in the range 10° C. to 300° C.;
 d) activation of the solid particles obtained from step c) (optionally from step c1)) by means of a reduction treatment, advantageously in pure or diluted hydrogen, at high temperature, in a manner such as to form particles of cobalt with an oxidation state of zero, i.e. in the metallic form, namely the active phase of the catalyst used in accordance with the invention.

Said oxide matrix is mesoporous, i.e. it is characterized by pores the size of which is in the range 2 to 50 nm in accordance with the IUPAC classification (K. S. Sing and al., Pure Appl. Chem., 1985, 57, 603). In addition to being mesoporous, said matrix may be mesostructured, i.e. have mesopores with a uniform size distributed in a periodic manner in said matrix, or in fact have a hierarchical porosity (presence of micropores and/or macropores in addition to mesopores). Highly preferably, the mesoporous oxide matrix of the catalyst used in accordance with the invention is an amorphous silica without micropores.

The term "molecular precursor comprising the element cobalt" means any compound comprising the element cobalt and which can release this element in solution in the reactive form, i.e. usually in a monomeric form, a monomer being considered in inorganic synthesis to be an entity existing on a molecular scale and which is capable of undergoing condensation reactions leading to the production of an oxide phase. Thus, at least one molecular precursor of the element cobalt is advantageously a salt, a coordination complex, a (hydr)oxide, etc. By way of non-exhaustive example, the following cobalt salts may be employed: $Co(NO_3)_2$ (nitrate), $CoZ_z$ in which Z=Cl, Br, I, F and z=2 or 3 (halides), $CoCO_3$ (carbonate), $CoSO_4$ (sulphate), $Co_3PO_4$ (phosphate), $Co(OOCCH_3)_2$ (acetate), $Co(CH_3COCHCOCH_3)_2$ (acetylacetonate), $Co_3(C_6H_5O_7)_2$ (citrate), $Co(C_2O_4)$ (oxalate) etc. Similarly, and still by way of example, coordination complexes $Co_2(CO)_8$ (dicobalt octacarbonyl) and $Co(NH_3)Cl_3$ may be used. It is also possible to use the hydroxide $Co(OH)_2$ and oxides of cobalt, provided that taking them up into solution ensures the formation of the monomeric reactive species mentioned above (using particular operating conditions such as pH, temperature, solvents), i.e. that said oxide or hydroxide does not remain in the solid form but dissolves in the mixture.

Similarly, the term "molecular precursor of said mesoporous oxide matrix comprising at least one element X selected from the group constituted by silicon, aluminium, titanium, zirconium, cerium and mixtures thereof, advantageously selected from the group constituted by silicon, aluminium and their mixtures. highly advantageously silicon", means any compound comprising the element X and which can release that element in solution in the reactive form, i.e. usually in the monomeric form, a monomer in inorganic synthesis being considered to be an entity existing on a molecular scale and which is capable of undergoing condensation reactions, resulting in the production of an oxide phase. Thus, a molecular precursor of the element X may advantageously be an inorganic salt of said element X with formula $XN_n$, (n=3 or 4), N being a halogen, the group $NO_3$, a perchlorate or a sulphate. The precursor of said element X may also be an alkoxide precursor with formula $X(OR)_n$ in which R=ethyl, isopropyl, n-butyl, s-butyl, t-butyl, etc. or a chelated precursor such as $X(C_5H_8O_2)_n$, in which n=3 or 4. The precursor of said element X may also be an oxide or a hydroxide of said element X, provided that dissolving it provides for the formation of the reactive monomeric species mentioned above, i.e. said oxide or hydroxide does not remain in the solid form, but dissolves in the mixture. In the preferred case in which X is silicon, the silicon precursor is advantageously the sodium silicate precursor with formula $Na_2SiO_3$, the chloride precursor with formula $SiCl_4$, an alkoxide precursor with formula $Si(OR)_{4-a}R'_a$ in which R=H, methyl or ethyl, and R' is an alkyl chain or a functionalized alkyl chain, for example a thiol, amino, β-diketone or sulphonic acid group, "a" being in the range 0 to 4, or an alkoxychloride precursor with formula $Si(OR)_{4-a}Cl_a$ in which R=H, methyl or ethyl, "a" being in the range 0 to 4. A preferred silicon precursor is tetraethyl-orthosilicate (TEOS). In the preferred case in which X is aluminium, the aluminium precursor is advantageously the precursor of an inorganic aluminium salt with formula $AlN_3$, N being a halogen or the $NO_3$ group. Preferably, N is a nitrate. The aluminium precursor may also be an inorganic aluminium salt with formula $Al_2N'_3$, N' being the sulphate group $SO_4$. The aluminium precursor may also be an alkoxide precursor with formula $Al(OR'')_3$ in which R''=ethyl, isopropyl, n-butyl, s-butyl or t-butyl, or a chelated precursor such as aluminium acetylacetonate $(Al(C_5H_7O_2)_3$. The aluminium precursor may also be an oxide or a hydroxide of aluminium, for example AlOOH.

The molecular precursor of the element cobalt and the molecular precursors of said mesoporous oxide matrix are dissolved in said aqueous or hydro-organic solvent, advantageously completely dissolved. The term "dissolved" means that the precursors are dissolved, or mixed if they are already in liquid form, in the solvent in order to form a homogeneous mixture.

Advantageously, said mixture in accordance with said step a) comprises molecular precursors comprising the element silicon as the only molecular precursors of said mesoporous oxide matrix. The mesoporous oxide matrix obtained is then constituted by silica.

Advantageously, said mixture in accordance with said step a) comprises, as the only molecular precursors of said mesoporous oxide matrix, molecular precursors comprising the element silicon and molecular precursors comprising the element aluminium, in a manner such that the silica content is in the range 0.5% to 95% by weight with respect to the total weight of said oxide matrix obtained, preferably in the range 0.5% to 30% by weight, more preferably in the range 1% to 30% by weight, and highly preferably in the range 1.5% to 20% by weight. Using routine tests, the person skilled in the art will adjust the quantity of molecular precursor in a manner such as to arrive at the desired content, adding precursors to the mixture when the content obtained is too low, and removing precursors from the mixture when the content obtained is too high. The mesoporous oxide matrix obtained is then constituted by an aluminosilicate, i.e. a mixture of the elements silicon and aluminium.

The mixture at the end of step a) of said process for the preparation of the catalyst used in accordance with the invention is clear, transparent and visually monophase, i.e. the objects in said mixture have a size below one micrometre. It is thus neither a suspension nor a slurry.

The term "hydro-organic solvent" means a solution of a mixture of water and an organic solvent. Preferably, the hydro-organic solvent is a hydro-ethanolic solution. Preferably, the mixture in accordance with said step a) is produced in an aqueous solvent, said mixture being clear and with a neutral, basic or acidic pH, preferably acidic.

Furthermore, incorporating at least one molecular precursor of the element cobalt may necessitate dissolving the latter prior to said step a), said solution then being introduced into the mixture of said step a). Preferably, the solvent used to dissolve at least one molecular precursor of the element cobalt is identical to at least one of the solvents used for the mixture of said step a).

Advantageously, said mixture in accordance with step a) also comprises at least one surfactant.

In the case in which a surfactant is used for the preparation of the mixture in accordance with step a) of the process for the preparation of the material in accordance with the invention, this latter usually being used as an agent for structuring the porosity, in particular for obtaining a mesoporous oxide matrix, said surfactant may be selected from any surfactant which is well known to the person skilled in the art. In particular, it may be ionic or non-ionic, or a mixture of the two. Preferably, the ionic surfactant is selected from phosphonium and ammonium ions, and highly preferably from quaternary ammonium salts such as cetyltrimethylammonium bromide (CTAB). Preferably, the non-ionic surfactant may be any (co)polymer with at least two portions with different polarities which provides them with amphiphilic macromolecular properties. Preferably, in the context of the present invention, a block copolymer is used which is constituted by chains of poly(alkylene oxide), including chains of poly(propylene oxide), denoted (PPO) and chains of poly(ethylene oxide), denoted (PEO). Highly preferably, a compound with formula $(PEO)_w-(PPO)_y-(PEO)_z$ is used, in which w is in the range 5 to 300 and y is in the range 33 to 300 and z is in the range 5 to 300. Preferably, the values for w and z are identical. Highly advantageously, a composition is used in which w=20, y=70 and z=20 (P123) and a compound in which w=106, y=70 and z=106 (F127) is used. Commercial non-ionic surfactants known by the names of Pluronic (BASF), Tetronic (BASF), Triton (Sigma), Tergitol (Union Carbide), Brij (Aldrich) may be used as non-ionic surfactants.

Step b) for spray drying the mixture obtained from step a) results in the formation of spherical droplets (aerosol). The mixture obtained in step a) of the preparation process is mixed with a first vector gas (air, nitrogen, etc) and as a whole it produces an aerosol after passage through the ultrasonic nozzle.

Step c) of the process for the preparation of the catalyst used in accordance with the invention is drying of said droplets at a temperature in the range 10° C. to 300° C. Contact of the droplets with a second vector gas heated to a controlled temperature means that they can be simultaneously conveyed and the solvent(s) used can gradually be evaporated off in order to form the mixture of step a) of the process and thus to obtain solid particles, generally spherical. A complementary drying step may be envisaged, for example via passage through an oven (or equivalent) at a temperature in the range 50° C. to 130° C.

Advantageously, said preparation process comprises a step c1) for heat treatment of the solid particles obtained from step c) and carried out upstream of step d) in a manner such as to remove residual water and volatile compounds, in a temperature range of 130° C. to 1000° C., preferably in the range 250° C. to 600° C., and more preferably in the range 350° C. to 500° C. for a period of less than 72 h and preferably less than 24 h. This latter is conventionally calcining in air, carried out in a flushed bed, fluidized bed, trickle bed or in a static atmosphere.

In a first particular embodiment of the process for the preparation of the catalyst used in accordance with the invention, just before step d), a step c') for hydrothermal treatment of the solid particles obtained from step c), optionally obtained from step c1), is carried out. The technical effect of this step is to increase the quantity of active cobalt to the detriment of the quantity of cobalt in the form of the silicate or aluminate, for example, which is inactive having regard to the reactions occurring in the Fischer-Tropsch process.

In said step c') of the first particular embodiment of the process for the preparation of the catalyst used in accordance with the invention, the solid particles obtained from step c) of the process are treated in steam at a temperature in the range 110° C. to 900° C., preferably in the range 110° C. to 450° C., more preferably in the range 110° C. to 250° C., for a period which is preferably from 30 minutes to 12 hours and with an air/steam mixture, said mixture comprising in the range 2% to 80% (molar) of water in the form of steam, preferably in the range 20% to 50% of water.

In a second particular embodiment of the process for the preparation of the catalyst used in accordance with the invention, just before step d), a step c") for impregnation of the solid particles obtained from step c) or from step c') is carried out using an aqueous or organic solution comprising at least one salt of a metal from group VIIIB selected from the group constituted by cobalt, nickel, ruthenium and iron, preferably cobalt, with drying of the product obtained at a temperature in the range 60° C. to 200° C. This step may be used to obtain the desired weight content of the element cobalt in the final catalyst.

Said step c") may advantageously be carried out by dry impregnation, by excess impregnation or also by deposition-precipitation using methods which are well known to the person skilled in the art. Preferably, said impregnation step is carried out by dry impregnation, preferably at ambient temperature. Said impregnation step consists of bringing the solid particles obtained from step c) into contact with at least one solution containing at least one precursor of said metal from group VIIIB, the volume of which is equal to the pore volume of said particles to be impregnated. This solution contains the metallic precursor of the metal or metals from group VIIIB at the desired concentration for obtaining the envisaged final metal content on the catalyst, advantageously a metal content in the range 0.5% to 60% by weight, and preferably in the range 5% to 30% by weight with respect to the weight of catalyst. The metal or metals from group VIIIB are brought into contact with said solid particles via any metallic precursor which is soluble in the aqueous phase or in the organic phase. When it is introduced in organic solution, the precursor of the metal from group VIIIB is preferably the oxalate or acetate of said metal from group VIIIB. Preferably, the precursor of the metal from group VIIIB is introduced in aqueous solution, preferably in the form of the nitrate, carbonate, acetate, chloride, oxalate, complexes formed by a polyacid or an acid-alcohol and its salts, complexes formed with acetylacetonates, or any other inorganic derivative which is soluble in aqueous solution, which is brought into contact with said solid particles. In the preferred case in which the metal from group VIIIB is cobalt, the cobalt precursor which is advantageously used is cobalt nitrate, cobalt oxalate or cobalt acetate. Most preferably, the precursor used is cobalt nitrate. The at least one salt of the metal from group VIIIB may be impregnated in a single or in a plurality of impregnation steps. In the case of high metal contents, impregnation in two steps or even in three steps is preferred. At the end of each of the impregnation steps, at least one optional supplemental step for drying and/or calcining and/or steam treatment is preferably carried out, the latter treatment being as described for step c'). The catalyst precursor obtained in this manner is then dried. Drying is advantageously carried out at a temperature in the range 60° C. to 200° C., preferably for a period of 30 minutes to 48 hours.

In accordance with step d) of the process for the preparation of the catalyst used in accordance with the invention, the activation of the solid particles obtained from step c), advantageously obtained from step c1), from step c') or from step c"), is carried out with the aid of a reduction treatment. Said activation or said reduction treatment may be carried out in situ (in the same reactor as that in which the Fischer-Tropsch synthesis is carried out) or ex situ before being charged into the Fischer-Tropsch synthesis reactor. The temperature of this reduction treatment is preferably in the range 200° C. to 600° C. and its duration is generally in the range 2 to 20 hours. This step can be used to reduce at least a fraction of the cobalt present in said catalyst into metallic cobalt, i.e. with an oxidation state of 0.

At least one element selected from groups VIIB, IA (i.e. an alkali element), IIA (i.e. an alkaline-earth element), IIIA, and the elements Rh, Pd, Ag, Os, Ir, Pt, Au, alone or as a mixture, is advantageously added to the mixture of step a) and/or during the impregnation step c") of the process for the preparation of catalyst carried out in the process of the invention in a manner such that said catalyst will comprise a content by weight of said at least one element which is in the range 20 ppm to 10%, preferably in the range 50 ppm to 5%, expressed as a % by weight of the element with respect to the total mass of said catalyst.

Description of the Catalyst

The invention concerns a Fischer-Tropsch process for the synthesis of hydrocarbons carried out with a catalyst comprising a mesoporous oxide matrix and at least the element cobalt, said element being incorporated during the formation of said matrix by means of at least one molecular precursor comprising cobalt and at least one molecular precursor of said mesoporous oxide matrix comprising at least one element X selected from the group constituted by silicon, aluminium, titanium, zirconium, cerium and mixtures thereof.

The catalyst used in accordance with the invention comprises a content by weight of the element cobalt which is in the range 0.5% to 60%, expressed as a % by weight of metal with respect to the total weight of said catalyst, and preferably in the range 5% to 30% by weight.

Advantageously, the catalyst used in accordance with the invention comprises a content by weight in the range 20 ppm to 10%, expressed as a % by weight of the element with respect to the total weight of catalyst, preferably in the range 50 ppm to 5% by weight, of at least one element selected from the groups VIIB, IA (alkali element), IIA (alkaline-earth element), IIIA, and the elements Rh, Pd, Ag, Os, Ir, Pt, Au, alone or as a mixture.

The catalyst prepared in accordance with the invention is characterized by a specific surface area which is generally in the range 50 to 600 $m^2/g$, preferably in the range 70 to 500 $m^2/g$ and more preferably in the range 90 to 400 $m^2/g$, by a pore volume which is generally in the range 0.1 to 1 mL/g, preferably in the range 0.2 to 0.7 mL/g and more preferably in the range 0.2 to 0.6 mL/g, and by a pore diameter which is generally in the range 2 to 12 nm and preferably in the range 5 to 9 nm.

The catalyst prepared in accordance with the invention may have a morphology which is in the form of beads, extrudates (for example with a trilobal or quadrilobal shape) or pellets, in particular when said catalyst is used in a reactor operating in fixed bed mode, or has a morphology in the form of a powder with a variable granulometry, in particular when said catalyst is used in a reactor of the bubble column type. Preferably, the catalyst used in accordance with the invention has a morphology in the form of a powder with a variable granulometry.

In order to illustrate the invention and to enable the person skilled in the art to carry it out, we shall now describe various embodiments of the process for the preparation of a catalyst used for the Fischer-Tropsch synthesis; however, these should not limit the scope of the invention.

EXAMPLES

In the examples below, the aerosol technique used was that described above in the disclosure of the invention. The catalysts were activated ex situ prior to the catalytic tests which represent the FT synthesis process. The spray dryer used was a commercial B290 apparatus supplied by Buchi, having an ultrasound spray drying nozzle.

Example 1 [Equates to the Preparation of the Catalyst Used in Accordance with the Invention]

Preparation of non-activated catalyst A comprising 15% by weight of the element Co with respect to the total weight of catalyst and a silica matrix obtained by incorporating a molecular precursor of the element cobalt, $Co(NO_3)_2$, during the formation of a mesostructured silica matrix.

13.53 g of TEOS (tetraethylorthosilicate, $Si(OC_2H_5)_4$) was added to 24.22 g of a solution of nitric acid at a pH of 2, and it was left to hydrolyse in its entirety at ambient temperature, with stirring, for 16 h. At the same time, 4.45 g of Pluronic P123 was added to 10.69 g of ethanol and 44.84 g of a solution of nitric acid at a pH of 2, and this too was left to hydrolyse in its entirety at ambient temperature, with stirring, for 16 h. The solution resulting from hydrolysis of the TEOS was then slowly added to the solution containing the dissolved P123. After homogenizing for 10 min, 5.03 g of an aqueous solution of cobalt nitrate $Co(NO_3)_2$ (13.4% by weight of the element cobalt) was finally added. After homogenizing for 15 min, it was sent in its entirety to the Buchi B290 spray drying apparatus. After spraying with the aid of the ultrasonic nozzle, the aerosol obtained was conveyed and dried by means of a vector gas (dry air) heated to an inlet temperature of 220° C. The harvested powder was additionally oven dried overnight at 100° C., then steam treated (50% molar water/air mixture) for 2 h at 200° C. and finally calcined in air for 12 h at T=400° C. The non-activated catalyst A obtained was characterized by the following textural properties (by means of a nitrogen volumetric analysis): specific surface area $S_{BET}$=460 m$^2$/g, pore volume $V_p$=0.6 mL/g, and pore diameter (measured using the desorption branch of the isotherm) $\phi$=6.8 nm. The mesoporous structure obtained was vermicular in type (using a small angle XRD analysis).

Example 2 [Equates to the Preparation of the Catalyst Used in Accordance with the Invention]

Preparation of non-activated catalyst B comprising 15% by weight of the element Co with respect to the total weight of catalyst and a silica matrix obtained by incorporating a molecular precursor of the element cobalt, $Co(NO_3)_2$, during the formation of a mesostructured silica matrix.

The catalyst B differed from catalyst A in that it did not undergo a steam treatment step during its preparation. The pH of the solution during mixing was also lower (1 instead of 2).

13.53 g of TEOS (tetraethylorthosilicate, $Si(OC_2H_5)_4$) was added to 24.22 g of a solution of nitric acid at a pH of 1, and it was left to hydrolyse in its entirety at ambient temperature, with stirring, for 16 h. At the same time, 4.45 g of Pluronic P123 was added to 10.69 g of ethanol and 44.84 g of a solution of nitric acid at a pH of 1, and this too was left to hydrolyse in its entirety at ambient temperature, with stirring, for 16 h. The solution resulting from hydrolysis of the TEOS was then slowly added to the solution containing the dissolved P123. After homogenizing for 10 min, 5.03 g of an aqueous solution of cobalt nitrate $Co(NO_3)_2$ (13.4% by weight of the element cobalt) was finally added. After homogenizing for 15 min, it was sent in its entirety to the Buchi B290 spray drying apparatus. After spraying with the aid of the ultrasonic nozzle, the aerosol obtained was conveyed and dried by means of a vector gas (dry air) heated to an inlet temperature of 220° C. The harvested powder was additionally oven dried overnight at 100° C., then calcined in air for 12 h at T=400° C. The non-activated catalyst B obtained was characterized by the following textural properties (by means of a nitrogen volumetric analysis): specific surface area $S_{BET}$=338 m$^2$/g, pore volume $V_p$=0.6 mL/g, and pore diameter (measured using the desorption branch of the isotherm) $\phi$=5.2 nm. The mesoporous structure obtained was vermicular in type (using a small angle XRD analysis).

Example 3 [Equates to the Preparation of the Catalyst Used in Accordance with the Invention]

Preparation of non-activated catalyst C comprising 15% by weight of the element Co with respect to the total weight of catalyst and an aluminosilicate matrix containing 5% by weight of silica with respect to the total weight of the matrix, obtained by incorporating a molecular precursor of the element cobalt, $Co(NO_3)_2$, during the formation of a mesoporous aluminosilicate matrix.

15.16 g of $AlCl_3$, $6H_2O$ and 0.53 g of TEOS was added to 23.69 g of a solution of nitric acid at a pH of 2, and it was left to hydrolyse in its entirety at ambient temperature, with stirring, for 30 min. Prior to this, 4.36 g of Pluronic P123 was added to 10.40 g of ethanol and 43.99 g of a solution of nitric acid at a pH of 2, and it was left in its entirety, with stirring, at ambient temperature for 16 h. The solution resulting from hydrolysis of the aluminium and silica precursors was then slowly added to the solution containing the dissolved P123. After homogenizing for 10 min, 8.7 g of an aqueous solution of cobalt nitrate $Co(NO_3)_2$ (13.4% by weight of the element cobalt) was finally added. After homogenizing for 15 min, it was sent in its entirety to the Buchi B290 spray drying apparatus. After spraying with the aid of the ultrasonic nozzle, the aerosol obtained was conveyed and dried by means of a vector gas (dry air) heated to an inlet temperature of 220° C. The harvested powder was additionally oven dried overnight at 100° C., then steam treated (50% molar water/air mixture) for 2 h at 200° C. and finally calcined in air for 12 h at T=400° C. The non-activated catalyst C obtained was characterized by the following textural properties (by means of a nitrogen volumetric analysis): specific surface area $S_{BET}$=60 m$^2$/g, pore volume $V_p$=0.2 mL/g, and pore diameter (measured using the desorption branch of the isotherm) $\phi$=6.5 nm.

Example 4 [Equates to the Preparation of the Catalyst Used in Accordance with the Invention]

Preparation of non-activated catalyst D comprising 15% by weight of the element Co with respect to the total weight of catalyst and a silica matrix obtained by incorporating a portion of the molecular precursor of the element cobalt, $Co(NO_3)_2$, during the formation of a mesostructured silica matrix, then incorporating a portion of the molecular precursor of the element, $Co(NO_3)_2$, by dry impregnation onto the solid obtained during the first step.

13.53 g of TEOS (tetraethylorthosilicate, $Si(OC_2H_5)_4$) was added to 24.22 g of a solution of nitric acid at a pH of 2, and it was left to hydrolyse in its entirety at ambient temperature, with stirring, for 16 h. At the same time, 4.45 g of Pluronic P123 was added to 10.69 g of ethanol and 44.84 g of a solution of nitric acid at a pH of 2, and this too was left to hydrolyse in its entirety at ambient temperature, with stirring, for 16 h. The solution resulting from hydrolysis of the TEOS was then slowly added to the solution containing the dissolved P123. After homogenizing for 10 min, 1.68 g of an aqueous solution of cobalt nitrate $Co(NO_3)_2$ (13.4% by weight of the element cobalt) was finally added. After homogenizing for 15 min, it was sent in its entirety to the Buchi B290 spray drying apparatus. After spraying with the aid of the ultrasonic nozzle, the aerosol obtained was conveyed and dried by means of a vector gas (dry air) heated to an inlet temperature of 220° C. The harvested powder was additionally oven dried overnight at 100° C., then calcined in air for 12 h at T=400° C. The solid obtained was characterized by the following textural properties (by means of a nitrogen volumetric analysis): specific surface area $S_{BET}$=345 m²/g, pore volume $V_p$=0.5 mL/g, and pore diameter (measured using the desorption branch of the isotherm) $\phi$=7.1 nm. The mesoporous structure obtained was vermicular in type (using a small angle XRD analysis).

The solid obtained was then dry impregnated with an aqueous solution of cobalt nitrate $Co(NO_3)_2$ (13.4% by weight of the element cobalt). The quantity of aqueous cobalt nitrate solution was adapted in order to introduce 10% by weight of the element cobalt onto the final solid; the cobalt nitrate solution was brought up to the pore volume using demineralized water. After oven drying for 12 hours at 120° C., the solid was calcined for 2 hours at 420° C. in a stream of air in a flushed bed type reactor. The non-activated catalyst D obtained contained 15.2% by weight of Co.

Example 5 [does not Conform with the Preparation of the Catalyst Used in Accordance with the Invention]

Preparation of non-activated catalyst E comprising 15% by weight of the element Co with respect to the total weight of catalyst and a silica matrix obtained by forming a mesoporous silicon oxide matrix then incorporating a molecular precursor of the element cobalt, $Co(NO_3)_2$, by dry impregnation onto the solid obtained during the first step.

13.53 g of TEOS (tetraethylorthosilicate, $Si(OC_2H_5)_4$) was added to 24.22 g of a solution of nitric acid at a pH of 2, and it was left to hydrolyse in its entirety at ambient temperature, with stirring, for 16 h. At the same time, 4.45 g of Pluronic P123 was added to 10.69 g of ethanol and 44.84 g of a solution of nitric acid at a pH of 2, and this too was left to hydrolyse in its entirety at ambient temperature, with stirring, for 16 h. The solution resulting from hydrolysis of the TEOS was then slowly added to the solution containing the dissolved P123. After homogenizing for 15 min, it was sent in its entirety to the Buchi B290 spray drying apparatus. After spraying with the aid of the ultrasonic nozzle, the aerosol obtained was conveyed and dried by means of a vector gas (dry air) heated to an inlet temperature of 220° C. The harvested powder was additionally oven dried overnight at 100° C., then calcined in air for 12 h at T=400° C. The solid obtained was characterized by the following textural properties (by means of a nitrogen volumetric analysis): specific surface area $S_{BET}$=129 m²/g, pore volume $V_p$=0.24 mL/g, and pore diameter (measured using the desorption branch of the isotherm) $\phi$=8.4 nm.

The solid obtained was then dry impregnated with an aqueous solution of cobalt nitrate $Co(NO_3)_2$ (13.4% by weight of the element cobalt) to the pore volume without dilution. After oven drying for 12 hours at 120° C., the solid was calcined for 2 hours at 420° C. in a stream of air in a flushed bed type reactor. The steps of impregnation, drying and calcining were carried out two more times. The non-activated catalyst E obtained contained 14.6% by weight of Co.

Example 6

Using the Catalysts A to E in the Fischer-Tropsch Synthesis

Before being tested in succession in the conversion of synthesis gas, the catalysts A to E were reduced ex situ in a stream of pure hydrogen at 400° C. for 16 hours in a tube reactor. Once the catalyst had been reduced, it was discharged under an atmosphere of argon and coated in Sasolwax® so that it could be stored shielded from air prior to the test. The Fischer-Tropsch synthesis reaction was carried out in a continuously functioning slurry type reactor operating with a concentration of 10% (by volume) of catalyst in the slurry phase.

The test conditions were as follows: temperature=230° C.; total pressure=2 MPa; molar ratio $H_2/CO$=2. The conversion of CO was kept between 45% and 50% throughout the duration of the test. The test conditions were adjusted in a manner such as to be at iso-conversion of CO irrespective of the activity of the catalyst.

The results in terms of activity were calculated for catalysts A to E with respect to the catalyst E which acted as the reference, and are shown in Table 1. The selectivities for the formation of methane are also given.

The results of Table 1 show the catalytic performances of catalysts A to E both in terms of activity and of selectivity. It appears that the catalysts in accordance with the invention, obtained with fewer unitary steps, had performances which were at least similar to the reference catalyst which was not in accordance with the invention.

TABLE 1

| Catalysts | Number of unitary steps of synthesis | Relative activity after 300 hours of test with a syngas feed | Selectivity for the formation of methane (%) |
|---|---|---|---|
| A (in accordance) | 5 | 175 | 9 |
| B (in accordance) | 4 | 129 | 12 |
| C (in accordance) | 5 | 95 | 10 |
| D (in accordance) | 7 | 258 | 8 |
| E (not in accordance) | 13 | 100 (base) | 11 |

The invention claimed is:
1. A process comprising synthesizing linear paraffinic hydrocarbons from a feed comprising carbon monoxide and hydrogen in the presence of a catalyst comprising a mesoporous oxide matrix and a content by weight of element cobalt in the range of 0.5% to 60%, expressed as the % by weight of metal with respect to the total weight of said catalyst, said process comprising subjecting said feed to synthesis conditions in the presence of the catalyst, wherein the catalyst has:
  a specific surface area of 90 to 400 m²/g,
  a pore volume of 0.2 to 0.6 mL/g, and
  a pore diameter of 5 to 9 nm, and
said catalyst has been prepared by a process comprising:
a) mixing, in an aqueous or hydro-organic solvent, at least one molecular precursor comprising cobalt, at least one surfactant and at least one molecular precursor of said mesoporous oxide matrix comprising at least one element X that is silicon, aluminium, titanium, zirconium, cerium or a mixture thereof, said molecular precursor comprising cobalt being dissolved in said aqueous or hydro-organic solvent;
b) spray drying the mixture obtained in a) to result in the formation of spherical liquid droplets;
c) drying said spherical droplets to obtain solid particles at a temperature in the range of 10° C. to 300° C.;
c1) heat treating the solid particles obtained from c), which heat treating is carried out upstream of d) at a temperature in the range of 130° C. to 1000° C., for a period of less than 72 h, and
d) activating said solid particles by a reduction treatment forming nanoparticles of cobalt with an oxidation state of 0.

2. The process as claimed in claim 1, wherein, in the process in which the catalyst has been prepared, one or more molecular precursors comprising the element silicon are the only molecular precursors of said mesoporous oxide matrix.

3. The process as claimed in claim 1, wherein, in the process in which the catalyst has been prepared, one or more molecular precursors comprising the element silicon and one or more molecular precursors comprising the element aluminium are the only molecular precursors of said mesoporous oxide matrix, wherein the silica content is in the range of 0.5% to 95% by weight with respect to the total weight of said oxide matrix.

4. The process as claimed in claim 1, wherein the process in which the catalyst has been prepared further comprises adding at least one element of group VIIB, IA, IIA or IIIA, or Rh, Pd, Ag, Os, Ir, Pt, or Au, alone or as a mixture, to the mixture of a) such that said catalyst comprises a content by weight of said at least one element in the range of 20 ppm to 10%, expressed as a % by weight of the element with respect to the total weight of said catalyst.

5. The process as claimed in claim 1, wherein, in the process in which the catalyst has been prepared, the at least one surfactant is an ionic surfactant, which comprises phosphonium or ammonium ions or is a non-ionic surfactant, which comprises a (co)polymer with at least two portions with different polarities which provide amphiphilic macromolecular properties.

6. The process as claimed in claim 1, wherein in c1) the heat treating is at a temperature in the range of 350° C. to 500° C., for a period of less than 24 h.

7. The process as claimed in claim 1, wherein the process in which the catalyst has been prepared further comprises c') hydrothermal treating the solid particles obtained from c), which is carried out upstream of d), in steam at a temperature in the range of 110° C. to 900° C., with an air/steam mixture, said mixture comprising in the range 2% to 80% (molar) of water in the form of steam.

8. The process as claimed in claim 7, wherein in c') hydrothermal treating is for a period of 30 minutes to 12 hours.

9. The process as claimed in claim 1, wherein the process in which the catalyst has been prepared further comprises, just before d), c'') impregnating the solid particles obtained with an aqueous or organic solution comprising at least one salt of a metal from group VIIIB selected from the group consisting of cobalt, nickel, ruthenium and iron, and drying the product obtained at a temperature in the range of 60° C. to 200° C.

10. The process as claimed in claim 9, wherein the process in which the catalyst has been prepared further comprises adding at least one element of group VIIB, IA, IIA or IIIA, or Rh, Pd, Ag, Os, Ir, Pt, or Au, alone or as a mixture, during the impregnation c'') such that said catalyst comprises a content by weight of said at least one element in the range of 20 ppm to 10%, expressed as a % by weight of the element with respect to the total weight of said catalyst.

11. A process for the synthesis of paraffinic hydrocarbons as claimed in claim 1, in which the $H_2/CO$ molar ratio is in the range of 0.5 to 4, operated at a total pressure in the range of 0.1 to 15 MPa, at a temperature in the range of 150° C. to 350° C., and at an hourly space velocity in the range of 100 to 20000 volumes of feed per volume of catalyst per hour.

12. The process as claimed in claim 1, wherein, in the process in which the catalyst has been prepared, the at least one surfactant is a quaternary ammonium salt.

13. The process as claimed in claim 1, wherein, in the process in which the catalyst has been prepared, the at least one surfactant is cetyltrimethylammonium bromide.

14. The process as claimed in claim 1, wherein, in the process in which the catalyst has been prepared, the at least one surfactant is of the following formula

$(PEO)_w(PPO)_y—(PEO)_z$ in which
PPO denotes poly(propylene oxide),
PEO denotes poly(ethylene oxide),
w is in the range of 5 to 300,
y is in the range of 33 to 300 and
z is in the range of 5 to 300.

15. The process as claimed in claim 1, wherein the catalyst has a pore diameter of 5.2 to 7.1 nm 5 to 7.1 nm.

* * * * *